(12) United States Patent
Kropp

(10) Patent No.: US 9,151,918 B2
(45) Date of Patent: Oct. 6, 2015

(54) OPTO-ELECTRONIC ASSEMBLY FOR PARALLEL HIGH SPEED TRANSMISSION

(71) Applicant: Joerg-Reinhardt Kropp, Berlin (DE)

(72) Inventor: Joerg-Reinhardt Kropp, Berlin (DE)

(73) Assignee: VI Systems GmbH, Berlin (DE)

( * ) Notice: Subject to any disclaimer, the term of this patent is extended or adjusted under 35 U.S.C. 154(b) by 257 days.

(21) Appl. No.: 13/846,392

(22) Filed: Mar. 18, 2013

(65) Prior Publication Data

US 2014/0270630 A1    Sep. 18, 2014

Related U.S. Application Data

(63) Continuation of application No. 12/805,952, filed on Aug. 26, 2010, now Pat. No. 8,439,578.

(51) Int. Cl.
*G02B 6/12* (2006.01)
*G02B 6/42* (2006.01)

(52) U.S. Cl.
CPC ........................................ *G02B 6/425* (2013.01)

(58) Field of Classification Search
None
See application file for complete search history.

(56) References Cited

U.S. PATENT DOCUMENTS

| | | | | |
|---|---|---|---|---|
| 576,832 | A * | 2/1897 | Bender | 224/440 |
| 5,369,529 | A * | 11/1994 | Kuo et al. | 359/858 |
| 5,987,202 | A * | 11/1999 | Gruenwald et al. | 385/49 |
| 6,364,542 | B1 * | 4/2002 | Deane et al. | 385/92 |
| 6,491,447 | B2 * | 12/2002 | Aihara | 385/92 |
| 6,504,107 | B1 * | 1/2003 | Kragl | 174/260 |
| 6,511,235 | B2 * | 1/2003 | Guo et al. | 385/88 |
| 6,711,186 | B2 * | 3/2004 | Komeda | 372/29.02 |
| 6,845,184 | B1 * | 1/2005 | Yoshimura et al. | 385/14 |
| 6,901,185 | B2 * | 5/2005 | Sasaki et al. | 385/33 |
| 6,921,214 | B2 * | 7/2005 | Wilson | 385/89 |
| 7,306,378 | B2 * | 12/2007 | Alduino et al. | 385/88 |
| 8,052,337 | B2 * | 11/2011 | Sameshima et al. | 385/94 |
| 8,079,125 | B2 * | 12/2011 | Ban et al. | 29/407.09 |
| 8,426,578 | B2 * | 4/2013 | Luo et al. | 536/24.3 |
| 8,757,897 | B2 * | 6/2014 | Kosenko et al. | 385/89 |

\* cited by examiner

*Primary Examiner* — Tina Wong
(74) *Attorney, Agent, or Firm* — VI Systems GmbH

(57) ABSTRACT

An opto-electronic assembly for high speed opto-electronic signal transmission which comprises:
  mounting plate with a top side; wherein the top side contains at least one area at a higher level and at least one area at a lower level,
  an electro-optical or opto-electronic transducer component with a number of transducers with the optical port of the transducer component on the top side;
  a micro-mirror component;
  an optical transmission path assigned to each transducer wherein the transmission axis of each transmission path is oriented substantially parallel to the surface of the transducer component and to the top side of the mounting plate; and
  a transducer component that is mounted with the bottom side on the mounting plate below a micro-mirror component that is mounted above the transducer component in such a configuration that the optical transmission path to or from each transducer is reflected at the dedicated mirror surface.

13 Claims, 4 Drawing Sheets

OPTO-ELECTRONIC ASSEMBLY FOR PARALLEL HIGH SPEED TRANSMISSION

REFERENCE TO RELATED APPLICATIONS

This is a continuation-in-part of U.S. patent application Ser. No. 12/805,952, filed Aug. 26, 2010, entitled: "Opto-Electronic Assembly for High Speed Transmission". The aforementioned application is hereby incorporated herein by reference.

BACKGROUND OF THE INVENTION

1. Field of the Invention

The present invention relates to optoelectronic apparatus, for example to signal interconnects between the electronics and the optical transmission medium and vice versa.

Advanced systems for long distance and short distance communication need very high speed interconnects for the inter system as well as intra system information transmission. The standard technology for this purpose is optical transmission over fibres. The key components for the aforementioned technology include the electro-optic (e-o) transducer acting as a transmitter, and the opto-electronic (o-e) transducer acting as a receiver. Such transducers are used in every optical communication system.

For the very high transmission speeds of 10 Gigabites per second (10 Gbit/sec) and above it is necessary to apply high speed optical and electronic components as well as special solutions for the packaging of such a transducer module in order to reach the required overall high-frequency (HF) performance.

A further increase of the transmission capacity is possible with parallel transmission of several channels. In this case there are additional critical issues that must be solved because a close spacing of radio frequency (RF) channels may lead to crosstalk and signal degradation. Therefore the proper design of the electronics and the packaging is even more challenging.

A transmitter or receiver module in general consists of the module housing with an electronic interface and an optical interface and the opto-electronic assembly inside the housing. The opto-electronic assembly consists of an arrangement of: 1) optical components such as laser diode and photodiode chips; 2) active electronic components such as patterned circuit boards and mounted integrated circuits; and 3) other mechanical or passive optical components, wherein all components are placed inside the housing. For parallel transmission there are typical several parallel channels and components on each optical or electronic chip. This configuration has the advantage that it is possible to reach higher density and lower cost.

To achieve good HF-performance with such an opto-electronic assembly it is necessary to use a circuit board with impedance-matched electrical transmission lines as well as an assembly and interconnection technology that is optimized for high speed signal transmission. Furthermore, the opto-electronic assembly has to comply with the type and performance specifications of the applied optical and electronic components.

Such opto-electronic assemblies are used inside packages that include an optical and an electronic interface (or port) which may have several independent parallel channels each. The optical interface of such a package is attached to an optical connector or optical fibre port and forms what is called a subassembly. The subassemblies with an optical connector for departing or entering optical data signals are called transmitter optical subassemblies (TOSAs) and receiver optical subassemblies (ROSAs), respectively. Such subassemblies are used as building blocks in higher complexity integrated modules such as various types of transceivers or transponders that include a TOSA and a ROSA and also various kinds of electronic functions via an electronic port. For these types of applications there is only a limited physical space and it is necessary that the package is designed in a geometry wherein the optical port and the electronic port are located on opposite sides of the package. Further such subassemblies may contain optical transmitting channels as well as optical receiving channels. Sometimes these subassemblies are called "optical engines".

2. Description of Related Art

Prior art of parallel optical assemblies for high speed interconnections with top-emitting transmitters like Vertical Cavity Surface Emitting Lasers (VCSELs) apply an optical polymer component for beam forming which is arranged at some distance on top of the transmitter chip. The polymer component includes a micro-lens, a mirror section and a further micro-lens for each optical channel located in front of each laser (see FIG. 1). A new version of such an optical polymer component is presented in the US patent application entitled "Lens Array and Optical Module Including Lens Array" by Morioka, filed Jul. 6, 2011, patent application Ser. No. 13/177,307, whereas this patent application is hereby incorporated by reference.

Another approach is published as "Parallel optical link (PAROLI) for multichannel gigabit rate interconnections", H. Karstensen et. al., ECTC Conference, pp. 747-754, 1998, whereas this publication is incorporated herein by reference. On top of the transducer chip with several VCSELs an optical fiber is aligned, having the endface polished in a 45° angle. This angled surface is used as a mirror to direct the emitted laser light from the VCSEL into the fiber which is arranged parallel to the surface of the transducer.

SUMMARY OF THE INVENTION

The present invention discloses an assembly and arrangement for such a high speed package which uses optical transducer chips having the emitting or receiving function perpendicular to the chip surface. Well-known optical transducers of this kind include photodiodes (PD) and vertical cavity surface emitting lasers (VCSELs).

In accordance with the characteristics of the present invention, the opto-electronic assembly for high speed opto-electronic signal transmission comprises:
- a mounting plate with a top side used for the mounting of components;
- an electro-optical or opto-electronic transducer component with a number of transducers with the optical port of the transducer component on the top side and a bottom side used for assembly;
- a micro-mirror component;
- an optical transmission path assigned to each transducer wherein the transmission axis of each transmission path is oriented substantially parallel to the surface of the transducer component and to the top side of the mounting plate; and
- a transducer component that is mounted with the bottom side on the mounting plate near a micro-mirror component that is mounted above the transducer component in such a configuration that the optical transmission path to or from each transducer is reflected at the dedicated mirror surface such that the transducer is optically coupled to the dedicated transmission path.

The various embodiments of the present invention include modifications of designs for the mounting plate and the micro-mirror component, and include the use of various standoff components. The compact assembly will show superior HF-characteristics. Moreover, a single design type of assembly may be used for both transmitter and receiver subassemblies.

DETAILED DESCRIPTION OF THE INVENTION

Figure 1:
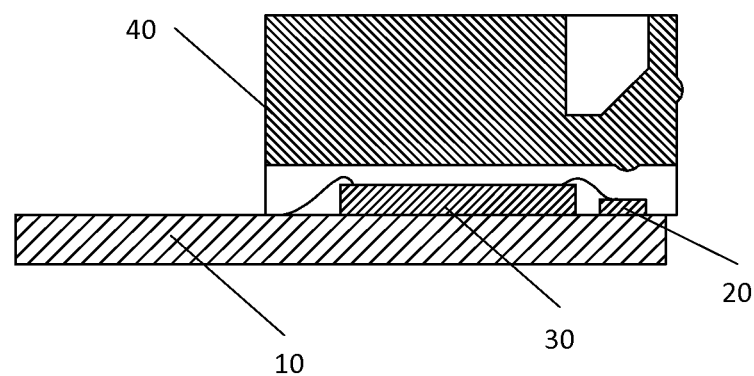
FIG. 1 presents a cross section of a prior art assembly with parallel channels on a flat mounting plate with an optical polymer lens-mirror component.

FIG. 1 shows a cross section of a prior art of an assembly for parallel optical transmission. The opto-electronic transducer component 20 and the integrated electronic circuit chip 30 are mounted on a flat mounting plate 10. A multifunctional optical polymer component for beam forming 40 is arranged at some distance on top of the transmitter chip. The polymer component 40 includes a micro-lens, a mirror section and a further micro-lens for each optical channel located in front of each laser. In the direction out of the drawing plane there are several channels arranged neighboring to each other. These channels may form an array of individual opto-electronic channels. Such polymer component is quite large (having dimensions typically exceeding 6 mm×2 mm×2 mm) and needs a very sophisticated manufacturing procedure to reach the optical quality and the necessary tight tolerances. Further the coefficient of thermal expansion of optical transparent polymers is much larger than that of the semiconductors. This may create large mechanical stress if such a configuration is applied to long linear arrays. This may cause misalignment of the optical channels of the individual transducers if the temperature of the assembly is changed.

Further the integrated electronic circuit chip 30 is connected electrically to the flat mounting plate 10 with thin wirebonds. Since the mounting plate 10 is flat the wirebonds have to connect the top side of the integrated electronic circuit chip 30 with the lower level surface of the mounting plate 10. Such connections across a height difference need longer length of the wirebonds which result in limited RF-performance of the assembly only.

Figure 2:
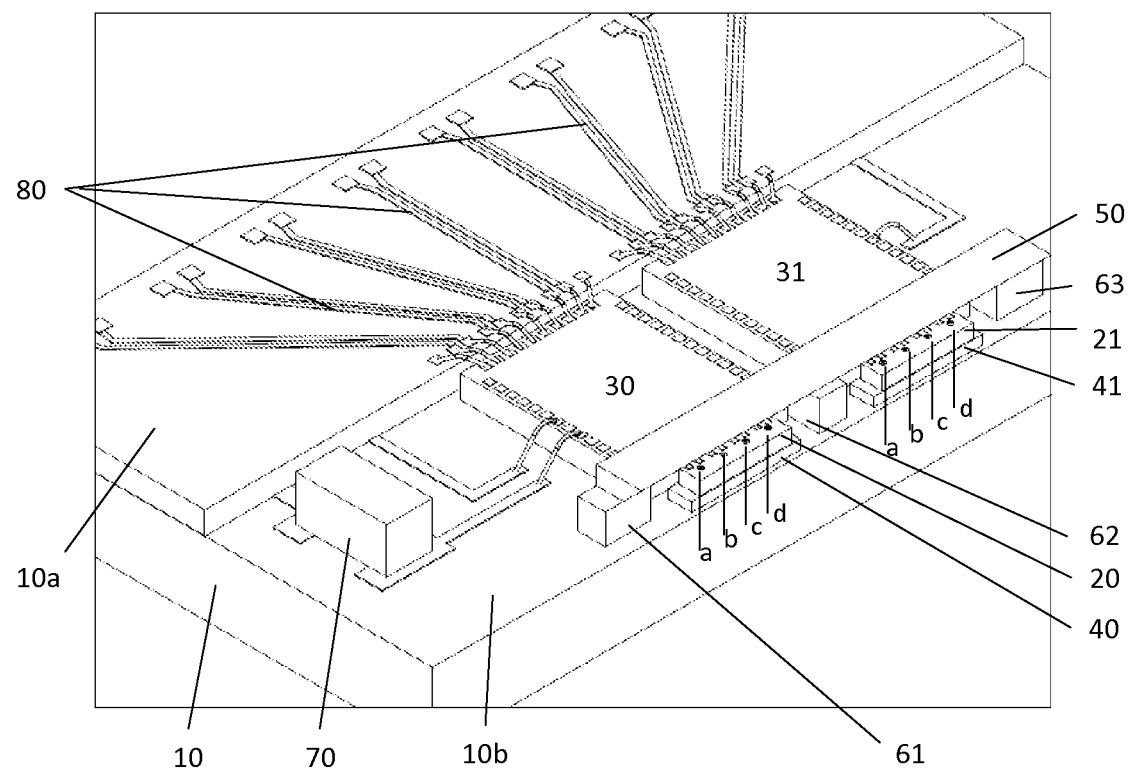
FIG. 2 shows a three dimensional (3D) drawing of an assembly with transducer components having several transducers.

FIG. 2 presents an exemplary embodiment of the present invention. A three-dimensional (3D) perspective view is shown. The mounting plate 10 comprises an area at higher level 10a with high frequency optimized electrical lines 80 and a lower area 10b. On the lower area 10b of the mounting plate 10 the following components are assembled: the electronic integrated circuits 30 and 31 as well as the transducer components 20 and 21. Each transducer component 20, 21 consists of several individual transducers 20 a, b, c, d and 21 a, b, c, d on the top side. Further on the top side of the transducer components 20 and 21 are located the electrical contact pads for the electrical connection of each individual transducer to the dedicated electronic circuit. The transducers 20 a, b, c, d and 21 a, b, c, d are connected with short and flat wire bonds to the integrated circuits 30 and 31 since the top surfaces of the electronic integrated circuits 30 and 31 as well as the transducer components are approximately at the same height level. Since transducer components and electronic integrated circuits in general do not have the same thickness the transducer components 20, 21 are mounted on some submount components 40 and 41. The height of the submount components 40, 41 is adjusted that top surfaces of the electronic integrated circuits 30 and 31 as well as those of the transducer components 20, 21 are approximately at the same height level.

Further the surface of the higher level 10a of the mounting plate is approximately at the same height level as the top surface of the electronic integrated circuits 30 and 31. Therefore the electronic integrated circuits 30 and 31 can be connected with short and flat wire bonds to the high frequency traces on the higher level 10a of the mounting plate 10.

A one skilled in the art will appreciate that it is of high importance to construct the assembly of FIG. 2 such that the higher level 10a of the mounting plate and the top surface of the electronic integrated circuits 30 and 31 are approximately at the same height level. It is preferred that a difference in height levels between the above mention components does not exceed 50 μm (micrometers). Further, it is preferred that a difference in height level between the top surface of the electronic integrated circuits 30 and 31, on the one hand, and between those of the transducer components 20 and 21, on the other hand, does not exceed 50 μm.

The mirror component 50 is arranged above the transducer components. It is mounted on the stand-off elements 61, 62 and 63 in such a position that a gap is formed between the top surface of the transducer components 20, 21 and the bottom surface of said micro-mirror component 50. In addition to the electronic integrated circuits 30 and 31 and the transducer components 20, 21 there can be mounted further active or passive electronic components 70 on the mounting plate 10.

Figure 3:
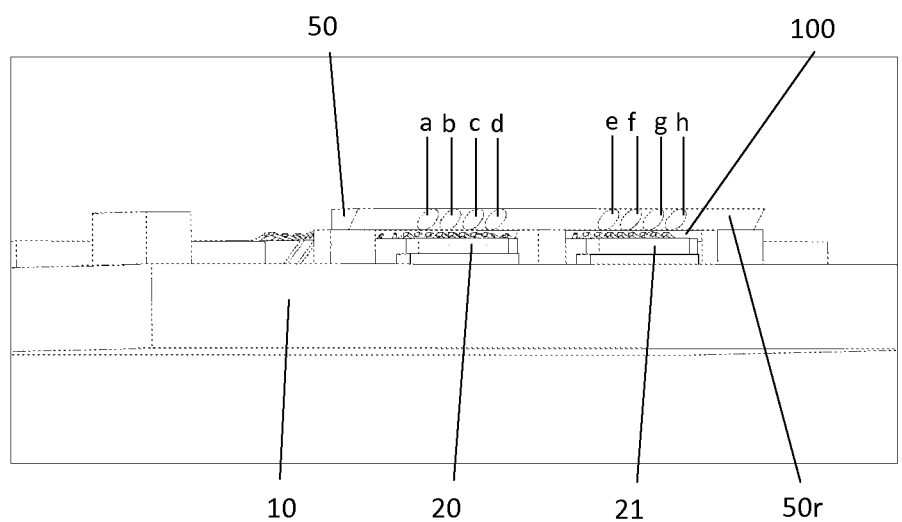
FIG. 3 illustrates the 3D view of an assembly with transducer components having several transducers from the front side.

FIG. 3 shows a 3D-front view to the exemplary embodiment of the patent. The micro-mirror component 50 has a reflecting mirror surface 50r which is oriented at an angle close to forty-five degrees towards the transducer components 20, 21. A one skilled in the art will appreciate that, for proper functionality of the assembly, the angle should be preferably in the interval between 42 degrees and 48 degrees. It is even more preferred that the angle is between 44 degrees and 46 degrees. The mirror surface 50r may contain separated surface sections a to h which are oriented each towards an individual transducer on the transducer components 20, 21. The surface sections a to h are coated with a material which is capable to achieve a high reflection of the relevant optical radiation which is transmitted or received by the transducers 20 a, b, c, d and 21 a, b, c, d.

In one embodiment of the present invention the surface 50r of the reflecting mirror is one flat surface which has the same form and orientation for all separated surface sections a to h.

In another embodiment of the present invention the reflecting mirror surface 50r has a special surface characteristic in the separated surface sections a to h different from a plane surface. As an example, the surface characteristic in each separated surface section a to h may be formed as a concave elliptic mirror.

Further FIG. 3 illustrate that the micro-mirror component 50 is located above the transducer components 20, 21 in such a configuration that a gap 100 is formed between the top surface of the transducer components 20, 21 and the bottom surface of said micro-mirror component 50. The gap 100 is large enough to provide the space for the short and flat wire-bond connections connecting the transducers with the electronic integrated circuits. A one skilled in the art will agree that the gap 100 should be preferably larger than 50 μm.

Figure 4:
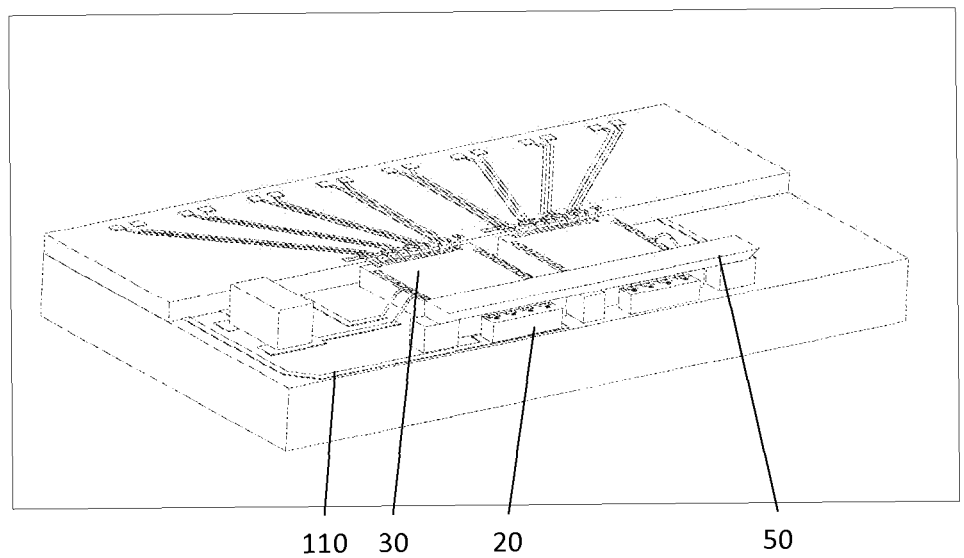
FIG. 4 shows an assembly with a transducer component having several transducers where the transducer component has an additional electrical third port at the bottom side of the transducer component.

FIG. 4 presents a further embodiment of the present invention. The transducer component 20 has electrical connections for the individual transducers on the top side and an additional electrical connection 110 on the bottom side. The connections on the top side are directly connected with the integrated electronic circuit 30 and are located below the micro-mirror component 50. The electrical connection at the bottom side 110 is not directly connected with the integrated electronic circuit 30. This transducer component can apply individual transducers which need three electrical connections with one of the three connections as a common connection for all transducers of the transducer component. One example of such an electro-optical transducer is a laser with integrated modulator, e.g., a VCSEL with an integrated modulator section. Possible embodiments of a VCSEL with an integrated modulator section include, but are not limited to those disclosed in the U.S. Pat. No. 7,369,583 "ELECTROOPTICALLY WAVELENGTH-TUNABLE RESONANT CAVITY OPTOELECTRONIC DEVICE FOR HIGH-SPEED DATA TRANSFER", filed Jun. 2, 2005, issued May 6, 2008, U.S. Pat. No. 7,593,436 "ELECTROOPTICALLY BRAGG-REFLECTOR STOPBAND-TUNABLE OPTOELECTRONIC DEVICE FOR HIGH-SPEED DATA TRANSFER", filed Jun. 16, 2006, issued Sep. 22, 2009, and U.S. Pat. No. 8,290,016 "OPTOELECTRONIC DEVICE FOR HIGH-SPEED DATA TRANSFER WITH ELECTROOPTICALLY TUNABLE STOPBAND EDGE OF A BRAGG REFLECTOR", filed Jul. 27, 2009, issued Oct. 16, 2012, all patents by Ledentsov et al., wherein these patents are hereby incorporated herein as reference. The electrical connection 110 at the bottom side of the transducer component 20 is used to drive all lasers in continuous mode and the high frequency modulation of the modulator section is connected on the top of the transducer component 20 directly to the integrated electronic circuit 30 to reach the good HF-performance.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

Although the invention has been illustrated and described with respect to exemplary embodiments thereof, it should be understood by those skilled in the art that the foregoing and various other changes, omissions and additions may be made therein and thereto, without departing from the spirit and scope of the present invention. Therefore, the present invention should not be understood as limited to the specific embodiments set out above but to include all possible embodiments which can be embodied within a scope encompassed and equivalents thereof with respect to the feature set out in the appended claims.

What is claimed is:

1. An opto-electronic assembly for high speed opto-electronic signal transmission comprising
   a) a mounting plate with a top side,
      wherein said top side further comprises at least one area at a higher level and at least one area at a lower level,
      wherein said mounting plate further comprises electrical conducting lines located on said at least one area at said higher level,
         wherein said conducting lines are designed for high frequency transmission at ten Gigabites per second and above;
   b) at least one first electro-optical or opto-electronic transducer component having a number of transducers and a number of electrical contact pads on the top side of said transducer component,
      wherein a bottom side of said transducer component is used for the assembly;
   c) at least one integrated electronic circuit chip having a number of electrical contact pads on the top side;
   d) at least one micro-mirror component with a number of micro-mirror sections;
   e) an optical transmission path assigned to each transducer wherein the transmission axis of each transmission path is oriented substantially parallel to the surface of the transducer component and to the top side of the mounting plate;
   wherein said at least one transducer component and said at least one integrated electronic circuit chip are mounted on said at least one area at said lower level of said mounting plate in such a way that
      i) said micro-mirror component is located above said at least one transducer component with the reflecting mirror surface oriented at an angle close to forty-five degrees towards said at least one transducer component, wherein each micro-mirror section of the micro-mirror component is oriented to the dedicated single transducer, and
      ii) a gap is formed between the top surface of said at least one transducer component and the bottom surface of said micro-mirror component; and
   f) electric connections directly connecting the pads of said at least one transducer component with selected a first group of contact pads of said a number of contact pads of said at least one integrated electronic circuit chip; and
   g) electric connections directly connecting contact pads of a second group of contact pads distinct from said first group of contact pads of said a number of contact pads of said integrated electronic circuit chip to said electric conducting lines on said at least one area at said higher level of said mounting plate.

2. The opto-electronic assembly of claim 1, wherein
at least one stand-off element is mounted on the top side of the mounting plate and that the at least one micro-mirror component is mounted on top of the stand-off element.

3. The opto-electronic assembly of claim 1, wherein
said at least one micro-mirror component is designed as a block with one side-face arranged at an angle of about 45 degrees to the top or bottom surface and that that side-face has micro-mirror sections with a surface quality and coating which is capable to achieve a high reflection of the relevant optical radiation emitted or received by the individual transducers.

4. The opto-electronic assembly of claim 2, wherein said at least one stand-off element has a shape of a plan-parallel plate with one of the plan-parallel surfaces mounted on the mounting plate and the opposite surface used as the basis to mount the at least one micro-mirror section of the micro-mirror in such a position that the mirror surface is oriented at an angle of about 45 degrees to the surface of the dedicated transducer.

5. The opto-electronic assembly of claim 2, wherein said at least one stand-off element is designed with at least one side-face which has an angle of about forty-five degrees and that the at least one micro-mirror section of the micro-mirror component is attached to that side-face in such a position that the mirror surface is oriented at an angle of about 45 degrees to the surface of the dedicated transducer.

6. The opto-electronic assembly of claim 1, wherein
the gap area between the upper surface of the at least one transducer component and the lower surface of the at least one micro-mirror component is at least partially filled with a globe top for the encapsulation of the transducer.

7. The opto-electronic assembly of claim 1, wherein
said micro-mirror component is designed with a bottom side with some portions standing back from other areas of the bottom side such that in the assembled configuration there exist a gap area between the bottom side of the micro-mirror and the upper side of the transducer.

8. The opto-electronic assembly of claim 1, wherein said at least one transducer component contains at least one photodiode and the at least one integrated electronic circuit is an amplifier with at least one amplifier channel that is electrically connected to the dedicated photodiode and with the micro-mirror component mounted above the transducer component such that there is a free gap between the top surface of the transducer component, the electrical connection from the at least one photodiode to the at least one amplifier channel and the top surface of the integrated electronic circuit on one hand and the bottom surface of the micro-mirror component on the other hand.

9. The opto-electronic assembly of claim 1, wherein said at least one transducer component consists of at least one top emitting optical transmitter and the at least one integrated electronic circuit is an electronic driver with at least one driver channel that is electrically connected to the dedicated optical transmitter and with the micro-mirror component mounted above the optical transducer component such that there is a free gap between the top surface of the optical transducer component, the electrical connection from the at least one optical emitter to the dedicated driver and the top surface of the integrated electronic circuit on one hand and the bottom surface of the micro-mirror on the other hand.

10. The opto-electronic assembly for high speed opto-electronic signal transmission of claim 1 further comprising
   h) at least one second electro-optical or opto-electronic transducer component distinct from said at least one first electro-optical or opto-electronic transducer component,
      wherein said at least one second electro-optical or opto-electronic transducer component has a number of transducers and a number of electrical contact pads on the top side of said transducer component,
   such that said optoelectronic assembly comprises multiple electro-optical or opto-electronic transducer components with a number of transducers on each transducer component.

11. The opto-electronic assembly for high speed opto-electronic signal transmission of claim 1, wherein each micro-mirror section is formed as an individual concave mirror which is combining the functions of beam reflection and beam focussing.

12. The opto-electronic assembly for high speed opto-electronic signal transmission of claim 1, wherein at least one transducer component has at least one additional electrical contact at the bottom side of the transducer component.

13. The opto-electronic assembly for high speed opto-electronic signal transmission of claim 12, wherein said at least one transducer component is a vertical cavity surface emitting laser monolithically integrated with an electro-optical modulator.

* * * * *